United States Patent
Nakazawa

(10) Patent No.: US 12,074,354 B2
(45) Date of Patent: Aug. 27, 2024

(54) FUEL CELL UNIT CELL

(71) Applicant: TOYOTA JIDOSHA KABUSHIKI KAISHA, Toyota (JP)

(72) Inventor: Satoshi Nakazawa, Gotemba (JP)

(73) Assignee: Toyota Jidosba Kabushiki Kaisha, Toyota (JP)

( * ) Notice: Subject to any disclaimer, the term of this patent is extended or adjusted under 35 U.S.C. 154(b) by 534 days.

(21) Appl. No.: 17/208,141

(22) Filed: Mar. 22, 2021

(65) Prior Publication Data

US 2021/0359321 A1    Nov. 18, 2021

(30) Foreign Application Priority Data

May 14, 2020    (JP) .................................. 2020-085431

(51) Int. Cl.
  *H01M 8/1004* (2016.01)
  *H01M 8/0273* (2016.01)
  *H01M 8/04119* (2016.01)

(52) U.S. Cl.
  CPC ....... *H01M 8/1004* (2013.01); *H01M 8/0273* (2013.01); *H01M 8/04149* (2013.01)

(58) Field of Classification Search
  CPC ........... H01M 8/1004; H01M 8/04149; H01M 9/0273; H01M 8/0273
  USPC ....................................................... 429/483
  See application file for complete search history.

(56) References Cited

U.S. PATENT DOCUMENTS

| | | | |
|---|---|---|---|
| 10,622,657 B1 * | 4/2020 | Kim .................... | H01M 8/1023 |
| 2006/0090317 A1 | 5/2006 | Wang et al. | |
| 2006/0159978 A1 | 7/2006 | Song et al. | |
| 2007/0209758 A1 | 9/2007 | Sompalli et al. | |
| 2007/0243446 A1 | 10/2007 | Hamrock et al. | |
| 2007/0287056 A1 | 12/2007 | Tanahashi et al. | |
| 2015/0380746 A1 * | 12/2015 | Fukuta ................ | H01M 8/0273 |
| | | | 429/535 |

FOREIGN PATENT DOCUMENTS

| | | |
|---|---|---|
| CN | 105226316 A | 1/2016 |
| DE | 112006002492 B4 | 6/2018 |
| JP | 2006-252858 A | 9/2006 |
| JP | 2006252858 A * | 9/2006 |

(Continued)

*Primary Examiner* — James M Erwin
(74) *Attorney, Agent, or Firm* — Finnegan, Henderson, Farabow, Garrett & Dunner, LLP

(57) ABSTRACT

The present disclosure provides a fuel cell unit cell with high durability. The fuel cell unit cell of the disclosure with increased durability is a fuel cell unit cell having a membrane electrode assembly and a support frame bonded together by a hot-melt adhesive layer, wherein the membrane electrode assembly has an electrolyte membrane and a pair of electrode catalyst layers stacked on either side of the electrolyte membrane, and on at least one side of the membrane electrode assembly, the electrode catalyst layers are stacked inside the outer peripheral sides of the electrolyte membrane and the hot-melt adhesive layer bonds together the outer peripheral sides of the electrolyte membrane and the support frame, with the hot-melt adhesive layer comprising an ethylene-vinyl alcohol copolymer with an ethylene-derived unit content of 90 to 99 mol %, or a polyamide in which the main chain has 9 to 15 methylene groups for each amide group, or a mixture of the two.

7 Claims, 1 Drawing Sheet

(56) References Cited

FOREIGN PATENT DOCUMENTS

| | | | |
|---|---|---|---|
| JP | 2007-538358 | A | 12/2007 |
| JP | 2008-512828 | A | 4/2008 |
| JP | 2008-523574 | A | 7/2008 |
| JP | 2014-137936 | A | 7/2014 |
| JP | 2016-201183 | A | 12/2016 |

\* cited by examiner

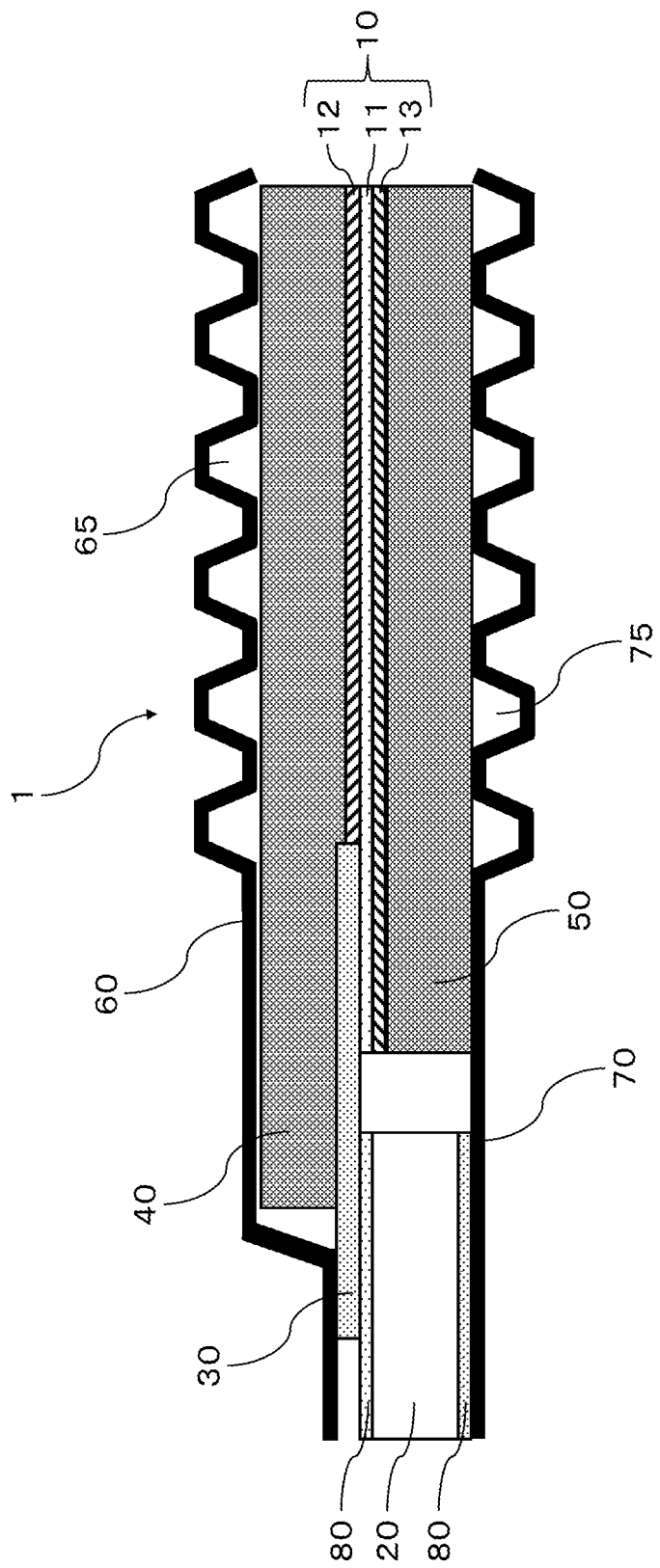

FUEL CELL UNIT CELL

FIELD

The present disclosure relates to a fuel cell unit cell.

BACKGROUND

Fuel cells are known in recent years that generate electricity by chemical reaction between an anode gas such as hydrogen and a cathode gas such as oxygen.

The fuel cell unit cells known as constituent elements of such fuel cells are structured in a manner comprising a membrane electrode assembly having an electrolyte membrane with electrode catalyst layers disposed on either side of the electrolyte membrane, gas diffusion layers and separators on both sides of the membrane electrode assembly.

The structure of a fuel cell unit cell may be such that, inside the membrane electrode assembly, the electrode catalyst layers are stacked inside the outer peripheral sides of the electrolyte membrane and the outer peripheral sides of the electrolyte membrane are bonded with an adhesive to other members such as the support frame.

The adhesive may be a liquid adhesive or a hot-melt adhesive.

PTL 1 discloses a fuel cell unit cell using a liquid adhesive as the adhesive layer.

PTLs 2 to 4 disclose fuel cell unit cells that use hot-melt adhesives as the adhesive layers.

More specifically, PTL 2 discloses using at least one hot-melt adhesive selected from the group consisting of ethylene-vinyl acetate (EVA), polyamides, polyolefins and polyesters, as well as their mixtures, as the adhesive.

PTL 3 discloses using one or more hot-melt adhesives selected from the group consisting of polyamino esters, ethylene-vinyl acetate polymers and polyamides as the adhesive.

PTL4 discloses using a cationic polymerizable adhesive having a ultraviolet curing property as the adhesive.

CITATION LIST

Patent Literature

[PTL 1] Japanese Patent Public Inspection No. 2008-512828
[PTL 2] Japanese Patent Public Inspection No. 2008-523574
[PTL 3] Japanese Patent Public Inspection No. 2007-538358
[PTL 4] Japanese Unexamined Patent Publication No. 2016-201183

SUMMARY

Technical Problem

In a fuel cell unit cell having a construction with electrode catalyst layers stacked inside the outer peripheral sides of the electrolyte membrane, the method for bonding together the outer peripheral sides of the electrolyte membranes and the support frame on at least one of the sides of the membrane electrode assembly may employ a liquid adhesive or hot-melt adhesive as in PTLs 1 to 4.

However, while a liquid adhesive such as disclosed in PTL 1 bonds firmly to the membrane electrode assembly, reaction takes place between volatile components in the liquid adhesive and catalyst metals such as platinum in the catalyst layer, producing decomposition gas. The decomposition gas can poison the catalyst metal, causing reduced output of the fuel cell.

When a liquid adhesive is used, therefore, a step for removal of the decomposition gas must be carried out as an extra step during the process for production of the fuel cell unit cell.

When the electrolyte membrane and support frame are bonded with a conventional hot-melt adhesive, on the other hand, the hot-melt adhesive often tends to detach from the electrolyte membrane in the environment inside the fuel cell unit cell, i.e. the hydrothermal environment, during use of the fuel cell unit cell.

When the electrolyte membrane and support frame are bonded with a conventional hot-melt adhesive, therefore, it is sometimes impossible to obtain sufficient durability for the fuel cell unit cell.

It is an object of the present disclosure to provide a fuel cell unit cell with high durability.

Solution to Problem

The present inventors have found that the aforementioned object can be achieved by the following means:

Aspect 1

A fuel cell unit cell having a membrane electrode assembly and a support frame bonded together by a hot-melt adhesive layer, wherein:

the membrane electrode assembly has an electrolyte membrane and a pair of electrode catalyst layers stacked on either side of the electrolyte membrane, on at least one side of the membrane electrode assembly, the electrode catalyst layers are stacked inside the outer peripheral sides of the electrolyte membrane, and the hot-melt adhesive layer bonds together the outer peripheral sides of the electrolyte membrane and the support frame, and the hot-melt adhesive layer comprises an ethylene-vinyl alcohol copolymer with an ethylene-derived unit content of 90 to 99 mol %, or a polyamide in which the main chain has 9 to 15 methylene groups for each amide group, or a mixture of the two.

Aspect 2

The fuel cell unit cell according to aspect 1, wherein the electrolyte membrane comprises a perfluorosulfonic acid polymer.

Aspect 3

The fuel cell unit cell according to aspect 2, wherein the perfluorosulfonic acid polymer is a polymer with a repeating unit represented by the following (A) to (C), or a combination thereof:

[Chemical Formula 1]

(A)
$$\left[ -(CF_2CF_2)_m - \underset{\underset{CF_2}{|}}{\underset{|}{C}} - \underset{F}{\overset{F}{\underset{|}{C}}} - \right]$$
$$F - \underset{CF_3}{\overset{CF_2}{\underset{|}{C}}} - O - CF_2CF_2 - SO_3^-H^+$$

[Chemical Formula 2]

(B)
$$\left[ -(CF_2CF_2)_m - \underset{\underset{CF_2}{|}}{\underset{|}{C}} - \underset{F}{\overset{F}{\underset{|}{C}}} - \right]$$
$$\underset{SO_3^-H^+}{\overset{CF_2}{\underset{|}{}}}$$

[Chemical Formula 3]

(C)
$$\left[ -(CF_2CF_2)_m - \underset{\underset{CF_2}{|}}{\underset{|}{C}} - \underset{F}{\overset{F}{\underset{|}{C}}} - \right]$$
$$F - \underset{O - CF_2CF_2 - SO_3^-H^+}{\overset{CF_2}{\underset{|}{C}}} - O - CF_2CF_2 - SO_3^-H^+$$

(where m is an integer of 1 or greater).

Aspect 4

The fuel cell unit cell according to any one of aspects 1 to 3, wherein the polyamide is nylon.

Aspect 5

The fuel cell unit cell according to aspect 4, wherein the polyamide is a polymer with a repeating unit represented by the following (P) and (Q), or a combination thereof:

[Chemical Formula 4]

(P)

[Chemical Formula 5]

(Q)

Aspect 6

The fuel cell unit cell according to any one of aspects 1 to 5, wherein the support frame is disposed away from the membrane electrode assembly, at the outer periphery of the membrane electrode assembly.

Aspect 7

The fuel cell unit cell according to any one of aspects 1 to 6, wherein:
a pair of gas diffusion layers are stacked on either side of the membrane electrode assembly, and
the hot-melt adhesive layer bonds together:
the gas diffusion layer among the pair of gas diffusion layers which is stacked on the electrode catalyst layer that is stacked inside the outer peripheral sides of the electrolyte membrane,
the outer peripheral sides of the electrolyte membrane and the support frame.

Aspect 8

The fuel cell unit cell according to aspect 7, wherein the pair of gas diffusion layers and a pair of separators are stacked in that order on both sides of the membrane electrode assembly.

Advantageous Effects of Invention

According to the present disclosure it is possible to provide a fuel cell unit cell with high durability.

BRIEF DESCRIPTION OF DRAWINGS

FIG. 1 is a schematic diagram showing part of a fuel cell unit cell according to an embodiment of the disclosure.

DESCRIPTION OF EMBODIMENTS

Embodiments of the disclosure will now be described in detail. The disclosure is not limited to the embodiments described below, however, and various modifications may be implemented which do not depart from the gist thereof.

The fuel cell unit cell of the present disclosure is a fuel cell unit cell having a membrane electrode assembly and a support frame bonded together by a hot-melt adhesive layer, wherein on at least one side of the membrane electrode assembly, the membrane electrode assembly has an electrolyte membrane and a pair of electrode catalyst layers stacked on either side of the electrolyte membrane, the electrode catalyst layers are stacked inside the outer peripheral sides of the electrolyte membrane and the hot-melt adhesive layer bonds together the outer peripheral sides of the electrolyte membrane and the support frame, the hot-melt adhesive layer comprising an ethylene-vinyl alcohol copolymer with an ethylene-derived unit content of 90 to 99 mol %, or a polyamide in which the main chain has 8 to 15 methylene groups for each amide group, or a mixture of the two.

A specific example of the structure of the fuel cell unit cell of the present disclosure will now be described while referring to FIG. 1.

FIG. 1 is a schematic diagram showing part of a fuel cell unit cell 1 according to an embodiment of the disclosure.

As shown in FIG. 1, the fuel cell unit cell 1 according to one embodiment of the disclosure is a fuel cell unit cell 1 in which a membrane electrode assembly 10 and a support frame 20 are bonded together by a hot-melt adhesive layer 30.

The membrane electrode assembly 10 has an electrolyte membrane 11, and a pair of electrode catalyst layers 12 and 13 stacked on either side of the electrolyte membrane 11. One of the electrode catalyst layers 12 and 13 is an anode catalyst layer while the other is a cathode catalyst layer.

In the fuel cell unit cell 1 according to one embodiment of the disclosure shown in FIG. 1, the electrode catalyst layer 12 on one side of the membrane electrode assembly 10 is stacked inside the outer peripheral sides of the electrolyte membrane 11, while the electrode catalyst layer 13 on the other side is stacked in a manner extending across the entire surface of the electrolyte membrane 11.

The hot-melt adhesive layer 30 bonds together the outer peripheral sides of the electrolyte membrane 11 and the support frame 20.

The fuel cell unit cell 1 according to one embodiment of the disclosure has a pair of gas diffusion layers 40 and 50 and a pair of separators 60 and 70, in addition to the structure described above.

While not shown in FIG. 1, in the fuel cell unit cell 1 according to one embodiment of the disclosure having the structure described above, the hot-melt adhesive layer 30 comprises an ethylene-vinyl alcohol copolymer with an ethylene-derived unit content of 90 to 99 mol % or a polyamide in which the main chain has 8 to 15 methylene groups for each amide group, or a mixture thereof.

FIG. 1 is not intended to limit the construction of the fuel cell unit cell of the disclosure. In particular, FIG. 1 is not intended to exclude cases of the fuel cell unit cell 1 of the disclosure wherein the electrode catalyst layer 13 is also stacked inside the outer peripheral sides of the electrolyte membrane 11 on the other side of the electrolyte membrane 11.

The principle responsible for the high durability of the fuel cell unit cell of the disclosure may be, but is not limited to, the following.

As mentioned above, as part of the structure of the fuel cell unit cell, on at least one side of the membrane electrode assembly, an electrode catalyst layer is stacked inside the outer peripheral sides of the electrolyte membrane, and a hot-melt adhesive layer bonds together the outer peripheral sides of the electrolyte membrane with the support frame, with the hot-melt adhesive layer being directly bonded to the electrolyte membrane.

The electrolyte membrane used in the fuel cell unit cell has a hydrophilic functional group. Thus, using an ethylene-vinyl alcohol copolymer or a polyamide as the hot-melt adhesive would be expected to provide high adhesion between the electrolyte membrane and hot-melt adhesive layer.

With a large number of hydrophilic functional groups in the ethylene-vinyl alcohol copolymer or polyamide in the hot-melt adhesive layer, however, the hot-melt adhesive layer is able to absorb water and expand in hydrothermal environments when the fuel cell unit cell is being used. When expansion of the hot-melt adhesive layer occurs, the hot-melt adhesive layer more easily detaches from the electrolyte membrane.

Therefore, a large number of hydrophilic functional groups of the ethylene-vinyl alcohol copolymer or polyamide in the hot-melt adhesive layer is thought to lower the durability of the fuel cell unit cell.

In contrast, in the fuel cell unit cell of the disclosure, the hot-melt adhesive layer comprises an ethylene-vinyl alcohol copolymer with an ethylene-derived unit content of 90 to 99 mol % or a polyamide in which the main chain has 8 to 15 methylene groups for each amide group, or a mixture thereof The ethylene-vinyl alcohol copolymer and polyamide have hydrophilic functional groups that contribute to bonding with the electrolyte membrane, while also having a significantly large number of hydrophobic methylene groups with respect to the hydrophilic functional groups.

Therefore, the hot-melt adhesive layer used in the fuel cell unit cell of the disclosure bonds to the electrolyte membrane while being resistant to water absorption and expansion in hydrothermal environments.

More specifically, the ethylene-vinyl alcohol copolymer in the hot-melt adhesive layer used in the fuel cell unit cell of the disclosure has a hydroxy group (—OH) as a hydrophilic functional group, and thus has high adhesion with the electrolyte membrane. The ethylene-derived unit content is 90 to 99 mol %, i.e. the number of hydrophobic methylene groups (—CH$_2$—) is much greater than the number of hydrophilic hydroxy groups (—OH). The proportion of hydroxy groups that can act on water in hydrothermal environments is therefore low, and the hot-melt adhesive layer has a low degree of expansion.

The polyamide of the hot-melt adhesive layer used in the fuel cell unit cell of the disclosure also has an amide group (—CO—NH—) as a hydrophilic functional group, and therefore has high adhesion with the electrolyte membrane. In addition, the main chain has 8 to 15 methylene groups for each amide group, i.e. the number of hydrophobic methylene groups (—CH$_2$—) is much greater than the number of hydrophilic amide groups (—CO—NH—). The proportion of amide groups that can act on water in hydrothermal environments is therefore low, and the hot-melt adhesive layer has a low degree of expansion.

The hot-melt layer of the fuel cell unit cell of the disclosure is therefore unlikely to detach from the electrolyte membrane even in hydrothermal environments, and high durability is exhibited.

Hot-Melt Adhesive Layer

The hot-melt adhesive layer bonds together the outer peripheral sides of the electrolyte membrane and the support frame. The hot-melt adhesive layer comprises an ethylene-vinyl alcohol copolymer with an ethylene-derived unit content of 90 to 99 mol % or a polyamide in which the main chain has 8 to 15 methylene groups for each amide group, or a mixture thereof The form of the hot-melt adhesive layer is not particularly restricted and may be a sheet form, for example. The hot-melt adhesive layer may also have a multilayer structure. The hot-melt adhesive layer may also comprise a rubber filler or crosslinking component, or a plasticizer, heat stabilizer or hydrolysis inhibitor, and/or a compatibilizer.

The thickness of the hot-melt adhesive layer may be 10 μm to 100 μm, for example. The thickness of the hot-melt adhesive layer may be 10 μm or greater, 20 μm or greater, 30 μm or greater or 40 μm or greater, and 100 μm or smaller, 90 μm or smaller, 70 μm or smaller or 50 μm or smaller.

Ethylene-Vinyl Alcohol Copolymer

The ethylene-vinyl alcohol copolymer to be used in the hot-melt layer of the fuel cell unit cell of the disclosure has an ethylene-derived unit content of 90 to 99 mol %.

If the ethylene-derived unit content is 90 mol % or greater, the number of methylene groups (—CH$_2$—) in the polymer will be significantly greater than that of the hydroxy groups (—OH) in the polymer, and therefore the hot-melt layer will be able to avoid expansion due to absorption of water in hydrothermal environments where the fuel cell unit cell will be used. This can help prevent detachment of the hot-melt layer from the electrolyte membrane.

With an ethylene-derived unit content of 99 mol % or lower, the hot-melt layer can adhere to the electrolyte membrane by the hydroxy groups (—OH) in the polymer.

The ethylene-derived unit content in the ethylene-vinyl alcohol copolymer used in the hot-melt layer of the fuel cell unit cell of the disclosure may be 90 mol % or greater, 91 mol % or greater, 93 mol % or greater or 94 mol % or greater, and 99 mol % or lower, 98 mol % or lower, 97 mol % or lower or 96 mol % or lower.

The content of vinyl alcohol-derived units in the ethylene-vinyl alcohol copolymer used in the hot-melt layer of the fuel cell unit cell of the disclosure may be 1 mol % to 10 mol %. The content of vinyl alcohol-derived units may be 1 mol % or greater, 2 mol % or greater, 3 mol % or greater or 4 mol % or greater, and 10 mol % or lower, 9 mol % or lower, 8 mol % or lower or 7 mol % or lower.

Polyamide

The polyamide used in the hot-melt layer of the fuel cell unit cell of the disclosure is a polyamide wherein the main chain has 8 to 15 methylene groups for each amide group.

If the main chain of the polyamide has 8 to 15 methylene groups for each amide group, then the number of amide groups (—CO—NH—) in the polymer will be significantly greater than the number of methylene groups (—CH$_2$—) in the polymer, and therefore the hot-melt layer will be able to avoid expansion due to absorption of water in hydrothermal environments where the fuel cell unit cell will be used. This can help prevent detachment of the hot-melt layer from the electrolyte membrane.

If the polyamide has an amide group (—CO—NH—), the hot-melt layer will be able to bond to the electrolyte membrane.

In the polyamide used in the hot-melt layer of the fuel cell unit cell of the disclosure, the number of methylene groups that the main chain has for each amide group may be 8 or more, 9 or more, 10 or more or 12 or more, and 15 or less, 14 or less, 13 or less or 12 or less.

The polyamide used in the hot-melt layer of the fuel cell unit cell of the disclosure may be a nylon polymer, and more specifically a polymer formed by polymerization of one or more monomers having the repeating unit —HN—(CH$_2$)$_n$—CO— (where n is integer of 8 to 15).

Even more specifically, the polyamide used in the hot-melt layer of the fuel cell unit cell of the disclosure may be a polymer having a repeating unit represented by the following (P) or (Q), for example, or a combination thereof:

[Chemical Formula 6]

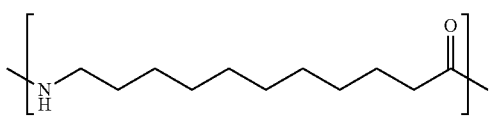

(P)

[Chemical Formula 7]

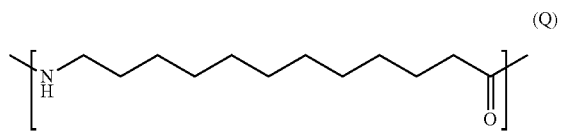

(Q)

Membrane Electrode Assembly

The membrane electrode assembly of the fuel cell unit cell of the disclosure has an electrolyte membrane and a pair of electrode catalyst layers stacked on both sides of the electrolyte membrane. On at least one side of the membrane electrode assembly, the electrode catalyst layer is stacked inside the outer peripheral sides of the electrolyte membrane.

Electrolyte Membrane

The material used for the electrolyte membrane may be any material that can be used in an electrolyte layer of a fuel cell unit cell. Examples of such materials include fluorine-based polymers with ionic conductivity, and more specifically ion-exchange polymers with proton conductivity comprising perfluorosulfonic acid, i.e. perfluorosulfonic acid polymers.

The perfluorosulfonic acid polymer may be a polymer having a repeating unit represented by the following (A) to (C), or a combination thereof:

[Chemical Formula 8]

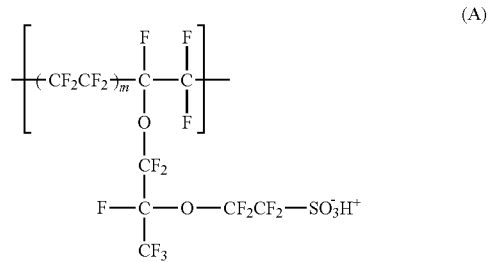

(A)

[Chemical Formula 9]

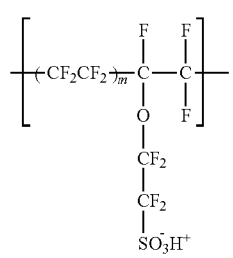

(B)

-continued

[Chemical Formula 10]

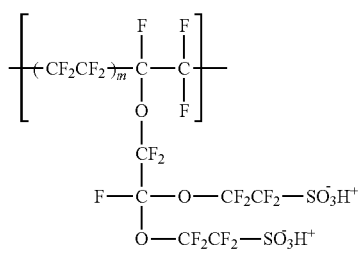

(C)

In the formulas, m represents an integer of greater than 1.

Electrode Catalyst Layer

Anode catalyst layers and cathode catalyst layers are types of electrode catalyst layers. Anode catalyst layers and cathode catalyst layers are layers of catalyst in which a catalyst metal is supported on a support.

The catalyst metal may be any catalyst metal that can be used as a catalyst for a fuel cell. Examples of such catalyst metals include Pt, Pd and Rh, and alloys containing them.

The support may be any support that can be used for a catalyst for a fuel cell. Such supports include carbon supports, and more specifically carbon particles selected from among glassy carbon, carbon black, active carbon, coke, natural graphite and artificial graphite.

Support Frame

The support frame is formed of any material having electrical insulating properties and airtightness. Examples of such materials include thermosetting resins and thermoplastic resins, among which thermoplastic resins such as polyethylenes, polypropylenes, cyclic polyolefin-based resins, polyphenylene ether resins, polyethylene naphthalate-based resins (PEN), polyetherimides, polyimides, polyphenylsulfones (PPS), polyethersulfones, polyphenylsulfones and polysulfones are preferred.

The support frame may be disposed away from the membrane electrode assembly on the outer periphery of the membrane electrode assembly.

Remaining Construction

The fuel cell unit cell of the disclosure may also have gas diffusion layers and separators, as the rest of the construction. In the fuel cell unit cell of the disclosure, the pair of gas diffusion layers and the pair of separators may be stacked in that order on both sides of the membrane electrode assembly.

In this type of construction, the hot-melt adhesive layer is able to bond the gas diffusion layer of the pair of gas diffusion layers stacked on the electrode catalyst layer that is stacked inside the outer peripheral sides of the electrolyte membrane, with the outer peripheral sides of the electrolyte membrane and the support frame. In addition to these, the hot-melt layer may also have the gas diffusion layers bonded together.

As shown in FIG. 1, for example, the fuel cell unit cell 1 according to one embodiment of the disclosure has a pair of gas diffusion layers 40 and 50, and a pair of separators 60 and 70. In FIG. 1, the pair of gas diffusion layers 40 and 50 are stacked on either side of the membrane electrode assembly 10. The hot-melt adhesive layer 30 bonds the gas diffusion layer 40 of the pair of gas diffusion layers 40 and 50, which is stacked on the electrode catalyst layer 12 that is stacked inside the outer peripheral sides of the electrolyte membrane 11, with the outer peripheral sides of the electrolyte membrane 11, the support frame 20 and with the separator 60.

Gas Diffusion Layer

Of the pair of gas diffusion layers, one is an anode gas diffusion layer and the other is a cathode gas diffusion layer.

The material for the gas diffusion layers may be any material that can be used in a gas diffusion layer for a fuel cell catalyst. Examples of such materials include conductive porous bodies. More specifically, such porous bodies may be carbon porous bodies such as carbon paper, carbon cloth or glassy carbon, or metal porous bodies such as metal mesh or foam metal.

Separator

The material of the separator may be any material that can be used as a separator in a fuel cell unit cell, and it may be a gas-impermeable conducting material, for example. Examples of such materials include dense carbon that has been rendered gas-impermeable by compaction of the carbon, and press-molded metal sheets.

Method for Producing Fuel Cell Unit Cell

The fuel cell unit cell of the disclosure can be produced by any publicly known production method, with the stipulation that the hot-melt adhesive layer has the construction described above. The temperature applied to the hot-melt adhesive layer during bonding between the outer peripheral sections of the electrolyte membrane and the support frame by the hot-melt adhesive layer may be set as appropriate for the material used for the hot-melt adhesive layer, and for example it may in a range of 80° C. or higher and lower than the melting point of the material used for the hot-melt adhesive layer.

EXAMPLES

Examples 1 to 4 and Comparative Examples 1 to 12

Example 1

A 40 µm-thick sheet made of an ethylene-vinyl alcohol copolymer with an ethylene-derived unit content of 95 mol % (EVOH, melting point: 105° C.) was cut to a rectangular shape of 10 mm length and 40 mm width, to prepare an adhesive layer strip for Example 1.

The sheet was molded by a casting method.

Example 2

An adhesive layer strip for Example 2 was prepared in the same manner as Example 1, except that the material used for the hot-melt adhesive layer strip was EVOH having an ethylene-derived unit content of 90 mol % (melting point: 110° C.).

Example 3

An adhesive layer strip for Example 3 was prepared in the same manner as Example 1, except that the hot-melt adhesive layer strip was a 40 μm-thick sheet made of nylon 12 (melting point: 178° C.).

The 40 μm-thick sheet made of nylon 12 (melting point: 178° C.) was molded by extrusion molding.

Example 4

An adhesive layer strip for Example 4 was prepared in the same manner as Example 3, except that the hot-melt adhesive layer strip was a 40 μm-thick sheet made of nylon 11 (melting point: 187° C.).

Example 5

An adhesive layer strip for Example 5 was prepared in the same manner as Example 3, except that the hot-melt adhesive layer strip was a 40 μm-thick sheet made of nylon 9 (melting point: 306° C.).

Comparative Example 1

An adhesive layer strip for Comparative Example 1 was prepared in the same manner as Example 3, except that the hot-melt adhesive layer strip used was a 40 μm-thick sheet made of EVOH having an ethylene-derived unit content of 38 mol % (melting point: 173° C.).

Comparative Example 2

An adhesive layer strip for Comparative Example 2 was prepared in the same manner as Example 1, except that the hot-melt adhesive layer strip used was a 40 μm-thick sheet made of EVOH having an ethylene-derived unit content of 81 mol % (melting point: 121° C.).

Comparative Examples 3 to 6

Adhesive layer strips for Comparative Examples 3 to 6 were prepared in the same manner as Example 3, except that the hot-melt adhesive layer strip used was a 40 μm-thick sheet made of ADMER (AT2937, product of Mitsui Chemicals, Inc., melting point: 141° C.), ADMER (AT3363, product of Mitsui Chemicals, Inc., melting point: 120° C.), ADMER (QP551, product of Mitsui Chemicals, Inc., melting point: 140° C.) and ADMER (QP500, product of Mitsui Chemicals, Inc., melting point: 165° C.), in that order.

Comparative Examples 7 to 12

Adhesive layer strips for Comparative Examples 7 to 12 were prepared in the same manner as Example 3, except that the hot-melt adhesive layer strip used was a 40 μm-thick sheet made of low-density polyethylene (LDPE, melting point: 108° C.), polymethyl methacrylate resin (PMMA, melting point: 160° C.), ethylene/vinyl acetate copolymer (90 mol % ethylene, melting point: 100° C.), nylon 6 (melting point: 225° C.), methyl methacrylate/ethylene copolymer (9 mass % ethylene, melting point: 100° C.) and nylon 66 (melting point: 269° C.), in that order.

Comparative Example 13

After placing 150 g of lauryl acrylate, 50 g of methyl methacrylate, 60 g of a vinyl ester-based resin and 4 g of a photoinitiator in a glass bottle they were mixed with a stirrer to uniformity to prepare an adhesive for Comparative Example 13.

Tensile Test

Adhesive Layer Strips of Examples 1 to 4 and Comparative Examples 1 to 12

A 25 μm-thick Nafion (registered trademark of DuPont) electrolyte membrane was cut to a rectangular shape of 10 mm length and 30 mm width to prepare an electrolyte membrane strip.

The adhesive layer strip of Example 1 and electrolyte membrane strip were stacked together with 10 mm-long, 10 mm-wide sections at the edges in the lengthwise direction mutually overlapping, and subjected to hot pressing for 1 minute at 1 MPa, 100° C. for thermocompression bonding of the adhesive layer strip and electrolyte membrane strip to form a test strip.

The thermocompression bonded test strip was placed in a vial and dipped in hot water at 95° C. for 500 hours. After cooling the test strip to 25° C. and reinforcing the adhesive layer strip with KAPTONE tape, it was used in a tensile test under conditions of 10 mm/min in a 25° C. environment until either the electrolyte membrane tore or the electrolyte membrane and adhesive layer strip detached.

The tensile test was conducted with a chuck at the 10 mm-long, 10 mm-wide edge on the side where the adhesive layer strip and electrolyte membrane strip were not mutually bonded. The adhesive layer strips of Examples 2 to 4 and Comparative Examples 1 to 12 were also subjected to a tensile test in the same manner as the adhesive layer strip of Example 1.

Adhesive of Comparative Example 13

The adhesive of Comparative Example 13 was coated onto the entirety of one side of a 50 μm-thick polyethylene terephthalate (PET) film, which was stacked with the adhesive-coated side of the adhesive layer strip of Comparative Example 13 contacting with the electrolyte membrane strip, in a manner so that the 10 mm-long, 10 mm-wide sections at the edges in the lengthwise direction were mutually overlapping. The stacked section was then irradiated with 400 mW×5 sec LED ultraviolet rays (wavelength: 365 nm) to bond together the adhesive layer strip and electrolyte membrane strip by ultraviolet curing.

The bonded test strip was placed in a vial and dipped in hot water at 95° C. for 500 hours. After cooling the test strip to 25° C. and reinforcing the adhesive layer strip with KAPTONE tape, it was used in a tensile test under conditions of 10 mm/min in a 25° C. environment until either the adhesive layer strip tore or the electrolyte membrane and adhesive layer strip detached.

Gas Generation Test

Adhesive Layer Strips of Examples 1 to 4 and Comparative Examples 1 to 12

A catalyst ink was obtained by using a bead mill to disperse and mix carbon black as the conductive support, a platinum-supported catalyst-supported material as the catalyst metal, Nafion (registered trademark of DuPont) as the electrolyte, ion-exchanged water and 1-propanol.

The obtained catalyst ink was coated onto one side of a polytetrafluoroethylene (PTFE) sheet using a spray system coating applicator and dried to form a 10 μm-thick catalyst layer, for use as an electrode sheet for a fuel cell.

Using Nafion (registered trademark of DuPont) as the electrolyte membrane, the fuel cell electrode sheet was bonded to one side of the electrolyte membrane with the catalyst layer in contact with it to fabricate a membrane electrode assembly. The bonding was carried out by hot pressing under conditions of 100° C., 10 min, 0.8 MPa.

The adhesive layer strip of Example 1 was stacked onto the catalyst layer side of the membrane electrode assembly, and the stack was heated for 1 minute with a hot press at 100° C., 1 MPa for bonding to obtain a test strip. The overlapping section between the catalyst electrode layer of the membrane electrode assembly and the adhesive layer strip for Example 1 was at least 5 mm wide and 2.5 mm long.

The test strip was gripped with a jig made of a glass epoxy material and anchored with a constraining pressure of 1 MPa, and then placed in a headspace crimp vial (round-bottomed, 10 mL) and sealed. Next, the amount (ppm) of carbon dioxide generated after 5 minutes while heated at 100° C. was quantified by gas chromatography.

The adhesive layer strips of Examples 2 to 4 and Comparative Examples 1 to 12 were also subjected to a gas generation test in the same manner as the adhesive layer strip of Example 1.

Adhesive of Comparative Example 13

A membrane electrode assembly was fabricated by the same method as in the gas generation test for the adhesive layer strip of Example 1.

The adhesive of Comparative Example 13 was coated onto the catalyst layer side of the membrane electrode assembly by screen printing to a size of 10 mm×50 mm and a thickness of 50 μm to obtain a test strip. The test strip was evaluated for generation of carbon dioxide (ppm) in the same manner as the gas generation test for the adhesive layer strip of Example 1.

Results

Table 1 shows the types of adhesive layers of the adhesives of the examples, and the results of the tensile tests and gas generation tests for the examples.

TABLE I

| | | Results | |
|---|---|---|---|
| Example | Type of adhesive layer or adhesive | Tensile test | Gas generation test |
| Example 1 | EVOH (95 mol % ethylene) | OK | OK |
| Example 2 | EVOH (90 mol % ethylene) | OK | OK |
| Example 3 | Nylon 12 | OK | OK |
| Example 4 | Nylon 13 | OK | OK |
| Example 5 | Nylon 9 | OK | OK |
| Comp. Example 1 | EVOH (38 mol % ethylene) | NG | OK |
| Comp. Example 2 | EVOH (81 mol % ethylene) | NG | OK |
| Comp. Example 3 | ADMER (AT2937, Mitsui Chemicals) | NG | OK |
| Comp. Example 4 | ADMER (AT3363, Mitsui Chemicals) | NG | OK |
| Comp. Example 5 | ADMER (QT551, Mitsui Chemicals) | NG | OK |
| Comp. Example 6 | ADMER (QF500, Mitsui Chemicals) | NG | OK |
| Comp. Example 7 | LDPE | NG | OK |
| Comp. Example 8 | PMMA | NG | OK |
| Comp. Example 9 | Ethylene/vinyl acetate copolymer (90 mol % ethylene) | NG | OK |
| Comp. Example 10 | Nylon 6 | NG | OK |
| Comp. Example 11 | Methyl methacrylate/ethylene copolymer (9 wt % ethylene) | NG | OK |
| Comp. Example 12 | Nylon 66 | NG | OK |
| Comp. Example 13 | Liquid adhesive | OK | NG |

Evaluation of "OK" in the "tensile test" in Table 1 means that the adhesive strip tore in the tensile test. Tearing of the adhesive strip means that the adhesive strip and the electrolyte membrane were firmly bonded together. Evaluation of "NG" in the "tensile test" in Table 1 means that the electrolyte membrane and adhesive layer strip became detached in the tensile test. Detachment of the electrolyte membrane and adhesive layer strip indicates that the adhesive strip and the electrolyte membrane were weakly bonded together.

Evaluation of "OK" in the "gas generation test" in Table 1 means that the amount of carbon dioxide generated was less than 1000 ppm. Evaluation of "NG" in the "gas generation test" in Table 1 means that the amount of carbon dioxide generated was 1000 ppm or greater. A carbon dioxide generation amount of 1000 ppm or greater means that the volatile component of the adhesive had decomposed by the platinum catalyst.

As seen in Table 1, the adhesive layer strips of Comparative Examples 1 to 12 all had evaluations of "NG" in the tensile test, while the adhesive layer strips of Examples 1 to 4 all had evaluations of "OK" in the tensile test.

As shown in Table 1, the adhesive layer strips of Examples 1 to 4 and Comparative Examples 1 to 12 all had evaluations of "OK" in the gas generation test.

REFERENCE SIGNS LIST

1 Fuel cell unit cell
10 Membrane electrode assembly
11 Electrolyte membrane
12, 13 Electrode catalyst layer
20 Support frame
30 Hot-melt adhesive layer 40, 50 Gas diffusion layer
60, 70 Separator

The invention claimed is:

1. A fuel cell unit cell comprising a membrane electrode assembly and a support frame bonded together by a hot-melt adhesive layer, wherein:
   the membrane electrode assembly comprises an electrolyte membrane, a first electrode catalyst layer stacked on a first side of the electrolyte membrane, and a second electrode catalyst layer stacked on a second side of the electrolyte membrane,
   the first electrode catalyst layer is stacked inside an outer peripheral side of the electrolyte membrane, and the hot-melt adhesive layer bonds together the outer peripheral sides of the electrolyte membrane and the support frame,
   the support frame is disposed in a region separate from the membrane electrode assembly and at the outer periphery of the membrane electrode assembly, and the membrane electrode assembly does not face toward the support frame in a stacking direction of the membrane electrode assembly, and
   the hot-melt adhesive layer comprises an ethylene-vinyl alcohol copolymer with an ethylene-derived unit content of 90 to 99 mol %, or a polyamide in which the main chain has 8 to 15 methylene groups for each amide group, or a mixture of the two.

2. The fuel cell unit cell according to claim 1, wherein the electrolyte membrane comprises a perfluorosulfonic acid polymer.

3. The fuel cell unit cell according to claim 2, wherein the perfluorosulfonic acid polymer is a polymer with a repeating unit represented by the following (A) to (C), or a combination thereof:

[Chemical Formula 1]

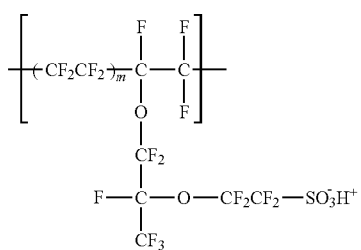

(A)

[Chemical Formula 2]

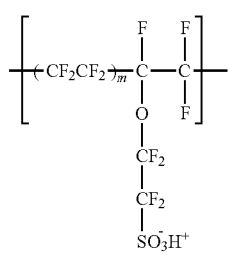

(B)

[Chemical Formula 3]

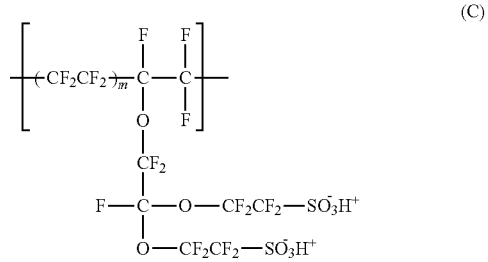

(C)

In the formulas, m represents an integer of greater than 1.

4. The fuel cell unit cell according to claim 1, wherein the polyamide is nylon.

5. The fuel cell unit cell according to claim 4, wherein the polyamide is a polymer with a repeating unit represented by the following (P) and (Q), or a combination thereof:

[Chemical Formula 4]

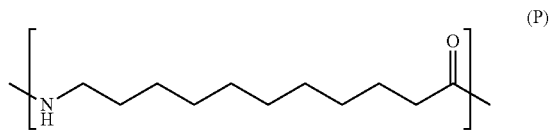

(P)

[Chemical Formula 5]

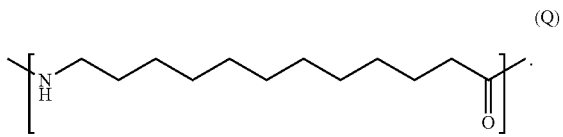

(Q)

6. The fuel cell unit cell according to claim 1, wherein:
   a first gas diffusion layer is stacked on the first electrode catalyst layer,
   a second gas diffusion layer is stacked on the second electrode catalyst layer, and
   the hot-melt adhesive layer bonds together:
   the first gas diffusion layer,
   the outer peripheral sides of the electrolyte membrane and the support frame.

7. The fuel cell unit cell according to claim 6, wherein: a first separator is disposed on the first gas diffusion layer and a second separate is disposed on the second gas diffusion layer.

* * * * *